(No Model.) 2 Sheets—Sheet 1.
E. GRANT.
MACHINE FOR MAKING FOUNDERS' CORES.
No. 512,289. Patented Jan. 9, 1894.
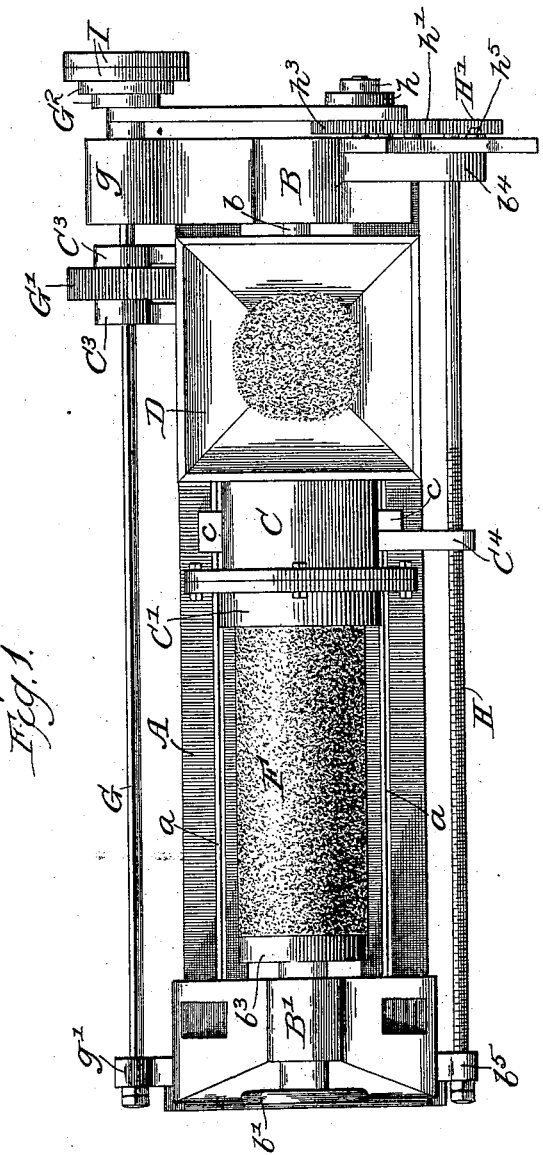
Witnesses:
Wm. F. Henning
Wm. M. Rheem
Inventor:
Edward Grant
By W. E. Williams
Attorney.

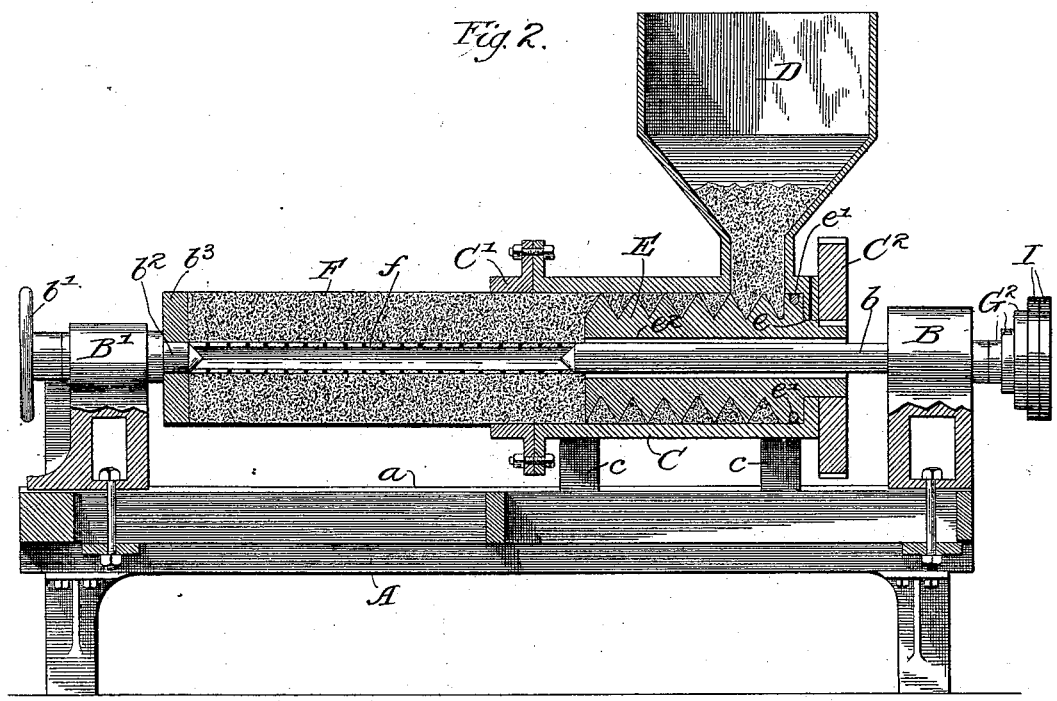

UNITED STATES PATENT OFFICE.

EDWARD GRANT, OF KANKAKEE, ILLINOIS.

MACHINE FOR MAKING FOUNDERS' CORES.

SPECIFICATION forming part of Letters Patent No. 512,289, dated January 9, 1894.

Application filed February 21, 1893. Serial No. 463,186. (No model.)

*To all whom it may concern:*

Be it known that I, EDWARD GRANT, a citizen of the United States, residing at Kankakee, in the county of Kankakee and State of Illinois, have invented a new and useful Improvement in Machines for Making Founders' Cores, of which the following is a specification.

My invention relates to machines for making large cores for columns, water pipes, &c., which are now made by hand and the objects of the invention are to produce a machine which will automatically make these cores around a central supporting shaft which ordinarily is constructed to carry off the gas in molding.

The invention consists in the elements and combinations of mechanical devices set forth in the claims.

Reference will be had to the accompanying drawings, in which similar letters refer to similar parts throughout the several views.

Figure 1 shows a plan of the machine; Fig. 2 a side sectional view thereof; Fig. 3 an end elevation of the machine.

In the drawings A. designates the frame of the machine, and "$a$" the ways on the bed of the same; and B. the head blocks carrying the forward spindle, and the driving mechanism; and B' the rear head block carrying the adjusting spindle and C. the core forming frame, which is carried on the bearing blocks $c$. on the ways $a$. of the frame A.

"D" designates the hopper into which the core material is placed, and "E" the ejecting worm of the core forming mechanism which is supported in the casing "C" and provided with a bearing "$e$" which is packed at "$e'$" to prevent the sand from getting into the bearing and is driven by a gear "$C^2$" engaging a gear "$G'$" on the shaft "G" which is supported in bearings "$g$" "$g'$" and driven by the tight and loose pulley "I." The gear "$G'$" slides on shaft "G" and is driven by it by a feather and key way and is carried with the core casing "C" by the bearing "$C^3$" of said casing. The worm "E" has a hole $e^2$ through its center through which extends the spindle "$b$" of the head block "B." The rear head block "B'" is provided with a spindle "$b^2$" which is extensible by a screw and hand wheel "$b'$" like an ordinary lathe spindle. Over this spindle "$b^2$" there is placed an abutment block "$b^3$" the size of the core to be made. The core frame "C" is carried backward and forward on ways "$a$" by the screw "H" supported by bearings "$b^4$" "$b^5$" on head blocks "B" and "B'" and by a projection "$C^4$" of the frame "C" into which it is threaded and said screw "H" is driven by gear "H'" and it by gear "$h'$" engaging gear "$h^3$" which is driven by cone pulley "$h$" driven by a band on cone pulley "$G^2$" on shaft "G." Gear wheels "$h'$" "$h^2$" are carried on an arm "$h^4$" which is pivoted to head block "B" concentric with shaft "H" and said arm $h^4$ is held in a fixed position by set screw "$h^5$" in a slot in arm "$h^4$." Gear wheel "$h'$" meshes at all times into gear wheel "H'" and gear wheel "$h^2$;" by shifting position of arm "$h^4$" gear wheel "$h'$" may be disengaged from gear wheel "$h^3$" and gear wheel "$h^2$" engaged with "$h^3$" thereby reversing the motion of screw "H" which carries the core frame "C" backward or forward as is desired and by means of the cone pulleys the speed of this travel of the frame "C" can be varied. The nozzle "C'" of the core frame "C" can be changed for one of smaller dimensions when cores of other size are to be made.

The operation of the machine is thus: The core frame "C" is run back against the head block "B" and a hollow core sustaining shaft "$f$" placed onto the spindles "$b$" "$b^2$" and held firmly by the hand wheel "$b'$;" then the core frame "C" is run forward till the nozzle "C'" is over the abutment blocks "$b^3$;" then core material is placed in the hopper "D" and the worm "E" set in motion and the casing "C" moves back as the core material is forced outward against the block "$b^3$" forming the core "F" as the casing "C" moves back.

I claim—

1. A core making machine having core forming mechanism consisting of a hopper for receiving and feeding the core material, a casing to which the core material is fed, having a nozzle for shaping the core, a worm within the casing for forcing the material out through the nozzle of the casing, a core sustaining shaft around which the core is formed, passing through the nozzle, and mechanism substantially as described, for holding the core sustaining shaft, combined with an abutment block "$b^3$" against which the core formation is commenced, substantially as shown and described.

2. In a core making machine a frame provided with a core-sustaining-shaft spindle "$b$" and core-forming-mechanism which is movable on the bed frame, the core sustaining shaft spindle "$b^2$" being adjustable to fit different length of core sustaining shafts, substantially as shown.

3. A core-forming machine having a bed frame "A" provided with ways "$a$" for carrying a core-forming-mechanism frame "C," said core-forming-mechanism frame "C," provided with mechanism for driving the core-forming-mechanism in any position it may be on the ways "$a$," and mechanism for moving said core-forming-mechanism on its ways "$a$," combined with mechanism substantially as shown and described for holding a core sustaining shaft "$f$."

4. A core-forming machine having mechanism for holding a core sustaining shaft, and mechanism for forming a core around said shaft substantially as described, having the screw shaft "H" for moving the core-forming-mechanism on its ways "$a;$" said screw shaft provided with driving mechanism which may be varied in its speed or its motion reversed or stopped at any position of the core forming mechanism.

5. A core forming mechanism, substantially as described, having the hopper "D" for the core material, the core cylinder "C" and worm "E" driven by a gear "$C^2$" combined with the spindles "$b$" and "$b^2$" for holding a core sustaining shaft "$f$" substantially as shown.

In witness whereof I have hereunto subscribed my name in the presence of two witnesses.

EDWARD GRANT.

Witnesses:
D. L. DURHAM,
H. E. BELLAMY.